United States Patent Office 2,847,869
Patented Aug. 19, 1958

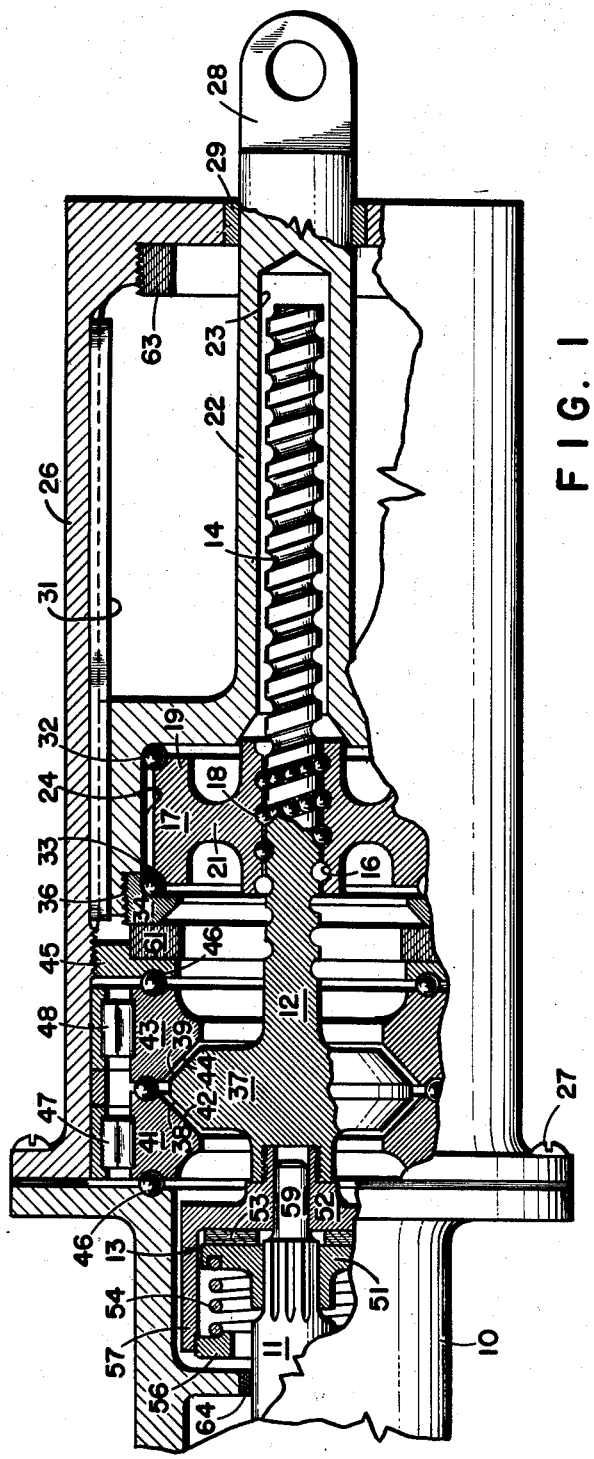

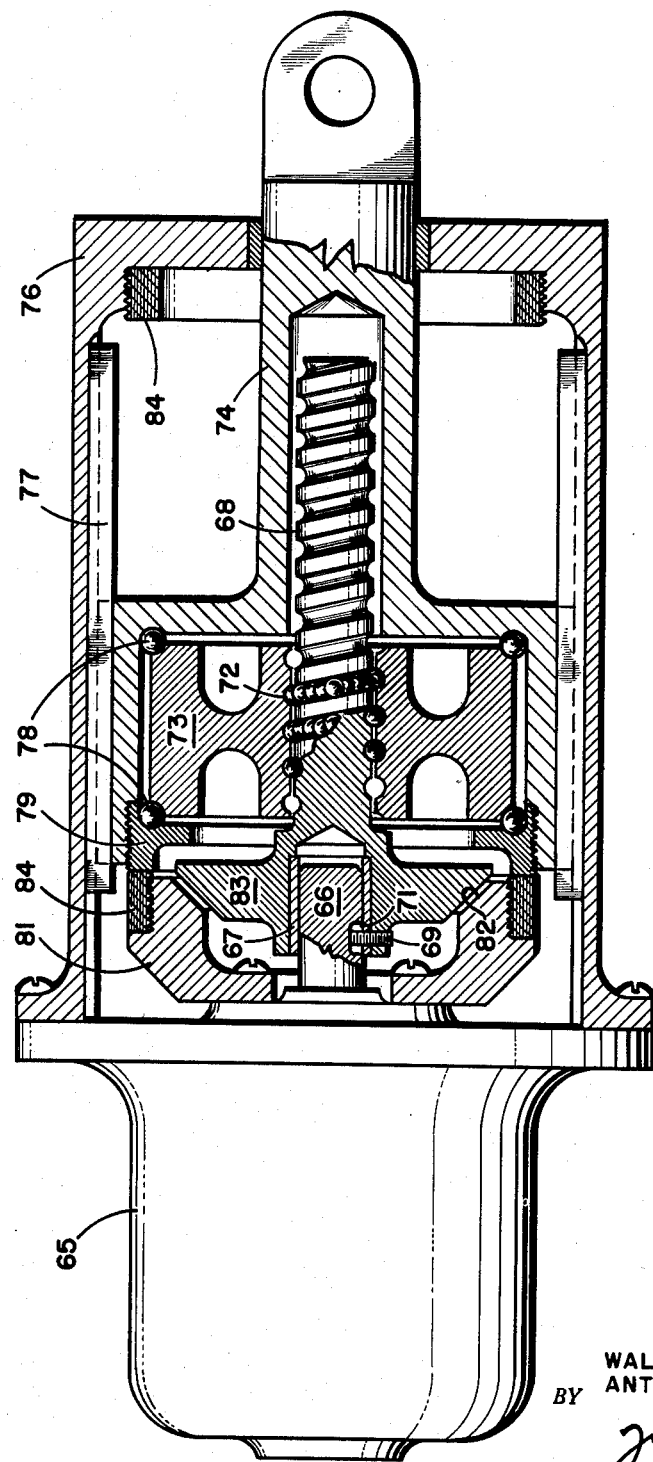

2,847,869

INERTIA ACTUATOR

Walter H. Hogan, Olmsted Falls, and Anthony F. Karlin, Maple Heights, Ohio, assignors to Cleveland Pneumatic Industries, Inc., a corporation of Ohio Application November 22, 1954, Serial No. 470,345

8 Claims. (Cl. 74—424.8)

This invention relates generally to linear actuators and more particularly to an inertia actuator.

In many installations it is desirable to provide an actuator capable of exerting large forces through relatively short distances wherein the actuator should be as light as possible. This is particularly true in aircraft installations and the like where weight must be reduced to the very minimum. Again, many installations require an actuator which is capable of exerting large forces in order to initiate movement wherein the total energy necessary for operation may be relatively small. Such installations include latch releases wherein large static friction must be overcome before operation can be achieved. Similar situations occur in the operation of devices which are not operated frequently so that rust or other forms of interference develop. It is also desirable in the operation of switches and contactors having high voltage to provide an actuator where extremely fast operation is achieved. The actuator according to this invention meets all of the above needs and provides a very simple light weight mechanism capable of fast operation with large forces.

This actuator utilizes the principle of storing energy in a rotating mass over a period of time after which this energy is converted into linear forces operating through a distance wherein the energy is expended almost instantaneously. Because the energy may be stored in the rotating mass over a period of time, it is possible to reduce the size and capacity of the motor means, thus achieving savings in cost and weight.

It is an important object of this invention to provide a new and improved actuator capable of producing large forces with a relatively low capacity motor means.

It is another important object of this invention to provide a device wherein kinetic energy may be stored over a period of time but which is capable of release almost instantaneously.

It is still another object of this invention to provide an inertia actuator which utilizes rotational kinetic energy stored in the device over a period of time to produce linear actuation.

It is still another object of this invention to provide a new and improved braking mechanism for use in combination with an actuator which stores rotational kinetic energy.

Further objects and advantages will appear from the following description and drawings, wherein:

Figure 1 is a side elevation partially in longitudinal section of a double-acting inertia actuator according to this invention;

Figure 2 is a fragmentary perspective view of the energy storing member shown in Figure 1; and, Figure 3 is a side elevation partially in cross section of a simplified embodiment of an actuator according to this invention.

An actuator according to this invention preferably includes a ball screw mechanism because of the high efficiency of such a device. In the preferred form a motor 10 provided with a drive shaft 11 is connected to a screw 12 of a ball screw mechanism by an overload clutch assembly 13. The screw 12 is formed with a right hand helical groove 14 which cooperates with a similar helical groove 16 formed in a nut 17 to define a helical ball channel filled with balls 18. The nut 17, best shown in Figure 2, is provided with a return tube 20 which connects the end of the ball channel and serves to convey the balls from one end of the nut to the other and complete the usual closed ball path.

Preferably the nut 17 is formed with an annular flange 19 connected to the central portion by means of integral spokes 21 so that the nut will have a relatively large rotational movement of inertia without necessitating a large mass.

An actuator member 22 formed with a first bore 23 adapted to receive the end of the screw 12 and a second bore 24 adapted to receive the nut 17, is mounted within a housing 26 which is secured to the housing of the motor 10 by means of screws 27. The outer end portion 28 of the actuating member 22 projects through the end of the housing 26 and is radially supported by a bushing 29. The inner end portion of the actuating member 22 is formed with keyways adapted to slide along keys 31 mounted on the inner wall of the housing 26. Thus the actuating member is mounted in the housing for axial motion but is restrained against any rotational motion by the keys 31.

Antifriction ball bearings 32 engage one side of the flange 19 and the actuating member 22 thus preventing axial motion of the nut relative to the actuating member to the right and similar ball bearings 33 are positioned between the other end of the flange 19 and a retaining ring 34 mounted on the actuating member 22 by the threads 36 thereby limiting axial motion of the nut relative to the actuating member to the left. This mounting eliminates any axial motion of the nut relative to the actuating member but permits free rotation of the nut even though the actuating member is fixed against rotation.

The screw 12 is formed with an enlarged brake portion 37 which provides opposed conical brake surfaces 38 and 39. Positioned adjacent to the brake surface 38 is a brake ring 41 provided with a conical surface 42 engageable by the brake surface 38 and positioned adjacent to the brake surface 39 is a second brake ring 43 provided with a conical surface 44 engageable by the brake surface 39. Both of the brake rings 41 and 43 are journaled within the housing 26 by the bearings 46 which cooperate with a bearing support 45 and the motor housing to limit axial motion of the brake rings without restraining them against rotational motion. An overrunning clutch 47 is positioned between the brake ring 41 and the housing 26 and prevents rotation of the brake ring 41 in a counterclockwise direction as viewed from the motor end but permits free rotation in the clockwise direction. The specific structure of the overrunning clutch forms no part of this invention and reference may be made to the patent to Troendly, Patent Number 2,683,510, for the structure of one overrunning clutch which could be used. A second similar overrunning clutch 48 is positioned between the brake ring 43 and the housing 26 and is arranged to prevent rotation of the brake ring 43 in the clockise direction and permit free rotation of the brake ring 43 in the counter-clockwise direction.

The clutch assembly 13 provides a torque limiting mechanism which prevents shocks from being transmitted to the motor 10 thus preventing damage thereto. This assembly includes a first clutch plate 51 mounted on the drive shaft 11 by a spline connection so that it may move axially relative thereto but is restrained against relative rotation. A second clutch plate 52 is threaded on the end of the screw 12 and is provided with a friction material 53, engageable with the first clutch plate 51 so that torque may be transmitted from the drive shaft 11 to the screw 12. The second clutch plate 52 is formed with a collar portion 57 which extends around the first clutch plate 51 and provides a support for a spring retainer 56. A spring 54 extends between a spring retainer 56 and the first clutch plate 51, thus urging the first clutch plate into engagement with the friction material 53. The end of the drive shaft 11 is provided with a bearing portion 59 which fits into a central opening in the second clutch plate 52 to provide radial support on the end of the screw 12.

A resilient bumper stop 61 is mounted on the bearing support 45 and is arranged to engage the retainer 34 and cushion any shock which might occur when the actuating member reaches the end of the stroke. A similar bumper stop 63 is mounted in the housing 26 and arranged to cushion the actuating member at the other end of the stroke.

In operation, if the actuating member 22 is at the left hand end of the stroke as shown in Figure 1, the motor 10 is started in a clockwise direction which will tend to cause the screw to be threaded axially to the right relative to the nut. During the acceleration, the inertia of the nut 17 resists acceleration thereof with the screw and tends to move the nut to the left relative to the screw toward the bumper stops 61. Since motion of the nut in this direction is impossible, a reaction will urge the screw to the right until the brake surface 39 engages the brake ring 43. The overrunning clutch 48 does not resist rotation since the free running direction is clockwise so the brake ring 43 merely rotates with the screw 12. Since no further axial motion is possible between any of the elements at this time, the screw 12, the nut 17 and the brake ring 43 will accelerate as a unit thus storing kinetic energy of rotation in the nut 17. When the desired rotational velocity is reached, the nut 17 will by virtue of its rotation have kinetic energy stored therein which can be delivered as actuator work. At this time the motor 10 will be shut off either by a manual switch or automatic means such as a centrifugal switch sensitive to rotational velocity.

When the motor 10 is shut off the drag of the motor will cause the screw 12 to slow down and since the nut 17 is journaled in antifriction bearings, the deceleration of the screw 12 will be greater than the deceleration of the nut 17. Thus means are provided to create a relative rotation between the screw 12 and the nut 17 in the counter-clockwise direction even though both of these elements will have a positive clockwise rotation. This relative counter-clockwise rotation between the screw 12 and the nut 17 creates axial motion therebetween which produces a reaction that moves the screw to the left until the brake surface 38 engages the conical surface 42 of the brake ring 41. It may be necessary in some designs to provide a frictional drag on the screw to balance the inherent drag in the nut so that the motor drag will be sufficient to produce a deceleration of the screw greater than the nut. In such cases a friction shoe 64 may be mounted for engagement with the shaft 11 to provide this additional drag. The overrunning clutch 47 is arranged to prevent rotation of the brake ring in the clockwise direction. Therefore, a frictional braking occurs which increases the rate of deceleration of the screw. This in turn increases the axial reaction between the nut and screw and thus increases the pressure of engagement between the brake surface 38 and the conical surface 42. The cone angle of the surfaces 38 and 42 and the coefficient of friction therebetween should be arranged so immediate locking occurs which brings the screw to a violent stop and prevents the dissipation of any energy of the nut in the braking. At this time the clutch assembly 13 will slip thus protecting the motor 10 from the violence of the braking action.

It is apparent that the preferred braking utilized in this actuator provides a novel means of shifting the braking portion 37 into a braking engagement which facilitates automatic brake operation. However, it is contemplated that in some cases mechanical means such as a solenoid operated yoke or its equivalent may be connected to the brake portion 37 to provide means for shifting the brake portion and thus operate the brake.

Since the screw 12 is stopped almost instantaneously, the kinetic energy of the nut 17 will cause the nut to rotate relative to the screw and be threaded axially to the right and in turn move the actuating member 22 toward the bumper stop 63. Because the nut 17 is accelerated over a period of time, which may be anywhere from a few seconds to much longer periods, a small motor may be utilized to drive the device. Yet when the screw 12 is stopped suddenly, this energy is delivered in the form of axial motion at a very fast rate through a relatively small distance so extremely large axial forces may be developed. Those skilled in the art will recognize that if the load or system actuated by the actuator is jammed or rusted, essentially unlimited forces will be delivered in order to initiate movement. This is due to the fact that the energy or rotation in the nut will be delivered as very high force if the distance of operation is very small or a lower force if the distance of operation is greater. Therefore, if the jamming or sticking is present, the only limitation upon the force delivered is the limit determined by the strength of the materials utilized to manufacture the actuator.

When the actuating member is at the right end of its stroke, the operation is reversed and the motor 10 will then be energized in a counter-clockwise direction. Acceleration in this direction tends to cause the nut to move to the right toward the bumper stop 63 and since the actuating member is already in engagement therewith, such motion is impossible. Therefore, a reaction will be created in the screw which moves the screw 12 to the left so that the brake surface 38 engages the brake ring 41. However, since rotation of the brake ring 41 is only limited by the overrunning clutch 47 in the clockwise direction, the screw 12, the nut 17 and the brake ring 41 will accelerate as a unit until the desired velocity is reached. At this time the motor is shut off and the screw will decelerate faster than the nut 17 and cause a reaction which moves the screw to the right and causes the brake surface 39 to engage the brake ring 43. Since counter-clockwise rotation is prevented by the overrunning clutch 48 the screw will be brought to a violent stop which will cause the nut to be threaded to the left.

Those skilled in the art will recognize that the actuator shown in Figure 1 can be operated in both directions and that very large actuating forces may be achieved since the nut 17 can be rotated at a high velocity. Since the amount of energy stored in the nut will be a function of the moment of inertia of the nut and the square of the velocity of rotation, essentially any desired amount of energy can be stored in the nut by properly selecting these two factors. Since the energy stored in a given nut is proportioned to the square of the velocity, a relatively light weight nut may be utilized if a high rotational velocity is used.

In the embodiment of Figure 3, a single-acting actuator is disclosed. This actuator is of a simplified structure utilizing the same principles as the actuator in Figure 1. However, it would be normally used in installations wherein a bias is provided by the load system to which the actuator is connected which tends to move the various elements back to their initial position after the actuator is operated. In this actuator a motor 65 is provided with a drive shaft 66, the end of which is journaled within a bearing 67 mounted in the end of a screw 68. The pin 69 is threaded through the end of the screw 68 and projects into an axially extending recess 71 formed in the drive shaft 66. This connection provides limited axial motion between the screw 68 and the drive shaft 66 while preventing relative rotation therebetween. Balls 72 connect the screw 68 to a nut 73 in the normal manner to provide a ball screw connection. The nut 73 is essentially the same as the nut shown in Figure 2 so the specific structure will not be enumerated.

An actuating member 74 similar to the actuating member 22 of Figure 1 is mounted within a housing 76 for axial motion while being limited against relative rotational motion by keys 77. Bearing 78 in cooperation with a retainer 79 mount the nut within the actuating member and prevent axial motion therebetween while permitting rotation of the nut. A stationary brake member 81 is mounted on the housing of the motor 65 and is provided with a conical surface 82 engageable by the brake portion 83 of the screw 68. Bumper stops 84 are arranged to engage the actuator 74 and the retainer 79 and cushion the actuator at the end of the stroke.

In operation the actuator of this embodiment must be started with the actuating member in the position shown in Figure 3. In this case the motor is started in a clockwise direction as viewed from the motor. The inertia of the nut 73 resists acceleration in this direction and creates an axial reaction between the nut and the screw which tends to move the nut to the left, which movement is prevented by the left hand bumper stop 84. This causes the screw 68 to move to the right away from the stationary brake member 81. When the desired rotational velocity is reached the motor is shut off and here again the frictional resistance is arranged so that the screw 68 decelerates faster than the nut 73. This causes a reaction in the screw to the left and brings the brake portion 83 into engagement with the stationary brake member 81. Here again the reaction force is increased as the engagement is increased so the screw is brought to a violent stop. This causes the nut to be threaded to the right along the screw and in turn moves the actuating member 72 to the right. As noted previously, exterior means should be provided to return the actuator to its original position with the actuating member 74 at the left end of its stroke before the actuator can be operated again.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. An actuator comprising a base, first and second cooperating screw threaded elements mounted for rotation relative to said base, a motor for rotating said elements, a brake member fixed against rotation relative to said base in the direction of motor rotation, a brake plate rotationally fixed to said first element and movable between a first position in engagement with said brake member and a second position spaced therefrom, engagement between said brake plate and brake member preventing rotation of said first element, and means for moving said brake plate from said second position to said first position after said elements are rotated by said motor and said motor is shut off whereby the inertia of rotation of said second element produces relative axial motion between said elements.

2. An actuator comprising a base, first and second cooperating screw threaded elements mounted for rotation relative to said base, an actuating member axially movable and rotatably fixed relative to said base, bearing means between said actuating member and said first element preventing relative axial motion therebetween, a motor for rotating said elements, a brake member fixed against rotation relative to said base in the direction of motor rotation, a brake plate rotationally fixed to said second element and axially movable between a first position in engagement with said brake member and a second position spaced therefrom, engagement between said brake plate and brake member preventing rotation of said second element, and means for moving said brake plate from said second position to said first position after said elements are rotated by said motor and said motor is shut off whereby the inertia of rotation of said second element produces relative axial motion between said actuating member and said second element.

3. An actuator comprising a base, a first screw threaded element journaled for rotation about its axis, means for limiting axial motion of said first element, a second cooperating screw threaded element rotationally and axially movable relative to said base, an actuating member axially movable and rotationally fixed relative to said base, bearing means between said second element and actuating member preventing relative axial motion therebetween, a motor for rotating said elements, a brake member fixed against rotation relative to said base in the direction of motor rotation, a brake plate rotationally fixed to said first element and axially movable between a first position in engagement with said brake member and a second position spaced therefrom, engagement between said brake plate and brake member preventing rotation of said first element, and means for moving said brake plate from said second position to said first position after said elements are rotated by said motor and said motor is shut off whereby the inertia of rotation of said second element produces relative axial motion of said actuating member.

4. An actuator comprising a base, first and second cooperating screw threaded elements mounted for rotation relative to said base, a motor for rotatably accelerating said second element, stop means limiting axial motion of said first element relative to said second element when said motor is rotatably accelerating said second element whereby said elements accelerate together, brake means operably connected between said base and said second element adapted to operate to prevent the rotation therebetween after rotational motion has been imparted to said elements by said motor and said motor has been shut off whereby the inertia of rotation of said first element produces axial motion between said elements.

5. An actuator comprising a base, first and second cooperating screw threaded elements mounted for rotation relative to said base, an actuating member axially movable and rotatably fixed relative to said base, bearing means between said actuating member and said first element preventing axial motion therebetween, a motor for rotatably accelerating said second element, stop means limiting axial motion of said first element relative to said second element when said motor is rotatably accelerating said second element whereby said elements accelerate together, brake means operably connected between said base and said second element adapted to operate to prevent the rotation therebetween after rotational motion has been imparted to said elements by said motor and said motor has been shut off whereby the inertia of rotation of said first element produces axial motion between said actuating member and said second element.

6. An actuator comprising a base, first and second cooperating screw threaded elements mounted for rotation relative to said base, an actuating member axially movable and rotatably fixed relative to said base, bearing means between said first element and actuating member preventing axial motion therebetween, a motor for rotatably accelerating said second element, stop means limiting axial motion between said elements when said motor is rotatably accelerating said second element whereby said elements accelerate together, a brake member fixed against rotation relative to said base in the direction of motor rotation, said second element being formed with a brake portion axially movable between a first position in engagement with said brake member and a second position spaced therefrom, engagement between said brake portion and brake member preventing rotation of said second element, the drag resisting rotation of said second element being arranged to reduce the rotation thereof at a rate greater than the drag resisting rotation of said first element reduces the rate of rotation thereof when both of said elements are rotating by virtue of their inertia whereby relative rotation between said second element and said first element in the direction opposite to motor rotation is created when said motor is shut off and said brake portion moves from said second position to said first position.

7. An actuator comprising a housing, a first screw threaded element journaled in said housing for rotation about its axis, a second cooperating screw threaded element journaled for rotation relative to said housing, a motor on said housing for rotating said first element, a first brake member mounted on said housing for rotary motion relative thereto in only one direction, a second brake member mounted in said housing for rotary motion relative thereto in only the other direction, and a brake plate rotatively fixed to said first element and axially movable between a first position in engagement with said first brake member and a second position in engagement with said second brake member, engagement between said brake plate and either of said brake members preventing relative rotation therebetween, the drag resisting rotation of said screw being arranged to reduce the rotation thereof at a greater rate than the drag resisting rotation of said nut reduces the rate of rotation thereof when both said nut and screw are rotating by virtue of their inertia whereby a reversal of reaction is created between said elements when said motor is shut off which moves said brake plate into engagement with the brake member that is rotatably fixed in the direction of rotation of said first element.

8. An actuator comprising a housing, a screw journaled in said housing for rotation about its axis, a cooperating nut on said screw, an actuating member mounted in said housing for axial motion relative thereto between a first and second position, bearing means between said nut and actuating member journaling said nut for rotation relative thereto and preventing axial motion therebetween, a motor on said housing, clutch means connecting said motor and said screw, a first brake member mounted on said housing for rotary motion relative thereto in only one direction, a second brake member mounted in said housing for rotary motion relative thereto in only the other direction, said screw being formed with a brake plate rotatively fixed to said screw and axially movable between a first position in engagement with said first brake member and a second position in engagement with said second brake member, engagement between said brake plate and either of said brake members preventing relative rotation therebetween, the drag resisting rotation of said screw being arranged to reduce the rotation thereof at a greater rate than the drag resisting rotation of said nut reduces the rate of rotation thereof when both said nut and screw are rotating by virtue of their inertia whereby a reversal of reaction is created between said nut and screw when said motor is shut off which moves said brake plate into engagement with the brake member that is rotatably fixed in the direction of screw rotation.

References Cited in the file of this patent

UNITED STATES PATENTS

| | | |
|---|---|---|
| 2,207,652 | Berges | July 9, 1940 |
| 2,660,026 | Geyer | Nov. 24, 1953 |
| 2,660,027 | Geyer | Nov. 24, 1953 |